(12) United States Patent
Brondijk

(10) Patent No.: US 9,076,460 B2
(45) Date of Patent: *Jul. 7, 2015

(54) MULTIPLE LAYER OPTICAL DISC, AND DEVICE FOR WRITING SUCH DISC

(71) Applicant: KONINKLIJKE PHILIPS N.V., Eindhoven (NL)

(72) Inventor: Robert A. Brondijk, Middelbeers (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/061,863

(22) Filed: Oct. 24, 2013

(65) Prior Publication Data
US 2014/0050066 A1 Feb. 20, 2014

Related U.S. Application Data

(63) Continuation of application No. 10/575,002, filed as application No. PCT/IB2004/051866 on Sep. 27, 2004, now Pat. No. 8,601,208.

(30) Foreign Application Priority Data

Oct. 6, 2003 (EP) .................................. 03103700

(51) Int. Cl.
*G06F 12/00* (2006.01)
*G11B 7/0045* (2006.01)
(Continued)

(52) U.S. Cl.
CPC .......... *G11B 7/0045* (2013.01); *G11B 27/3027* (2013.01); *G11B 27/329* (2013.01); *G11B 2220/218* (2013.01); *G11B 2220/235* (2013.01); *G11B 2220/2562* (2013.01)

(58) Field of Classification Search
CPC . G11B 7/0045; G11B 27/3027; G11B 27/329
See application file for complete search history.

(56) References Cited

U.S. PATENT DOCUMENTS 5,920,527 A 7/1999 Aoki
6,385,388 B1 5/2002 Lewis et al.
(Continued)

FOREIGN PATENT DOCUMENTS

EP 1052644 A1 11/2000
EP 1204106 A2 8/2002
(Continued)

OTHER PUBLICATIONS

ISR; PCT/IB04/051866, Sep. 27, 2004.
(Continued)

*Primary Examiner* — Baboucarr Faal

(57) ABSTRACT

A data storage system (1) comprises:
an optical disc (2) having a physical storage space (3) comprising two layers (L0; L1) of physical storage locations, the physical storage space comprising a logical storage space (LSS) which contains storage locations within a first layer (L0) and within a second layer (L1), the storage locations in said logical storage space having contiguously numbered logical addresses (LA);
a disc drive (10) capable of writing information in the logical storage space of said optical disc;
the disc drive having an address limit memory (12), containing at least a value for a parameter LAmax indicating the maximum value of said logical addresses of the storage locations (4) in said first storage layer (L0);
the disc drive (10) being capable of changing the value in said address limit memory (12); and
a host device (20), capable of cooperating with said disc drive (10).

3 Claims, 8 Drawing Sheets

(51) Int. Cl.
*G11B 27/30* (2006.01)
*G11B 27/32* (2006.01)

(56) References Cited

U.S. PATENT DOCUMENTS

| | | |
|---|---|---|
| 6,452,889 B2 | 9/2002 | Ono et al. |
| 6,552,970 B2 | 4/2003 | Ono et al. |
| 2001/0030916 A1 | 10/2001 | Lee |
| 2003/0081535 A1 | 5/2003 | Ross |
| 2006/0195719 A1 | 8/2006 | Ueda et al. |

FOREIGN PATENT DOCUMENTS

| | | |
|---|---|---|
| EP | 1329888 A1 | 7/2003 |
| EP | 1517312 A2 | 3/2005 |
| JP | 09259527 A | 3/1997 |
| JP | 09231613 A | 5/1997 |
| JP | 2000105972 A | 4/2000 |
| JP | 2000285609 A | 10/2000 |
| JP | 2000293947 A | 10/2000 |
| JP | 2001195198 A | 7/2001 |
| WO | 0101415 A1 | 1/2001 |

OTHER PUBLICATIONS

Written Opinion: PCT/IB04/051866 Sep. 27, 2004.
Taylor, "DVD-Video: Multimedia for the Masses", IEEE Multimedia, Jul.-Sep. 1999, p. 86-92.
The Unofficial DVD Specifications Guide Release Version 2.2.5, Section 2 DVD Elements an Hierachy, 2.1 Cells, 2003-0005, 29 Page Document.

Table 1 - RESERVE TRACK Command Descriptor Block

| Bit<br>Byte | 7 | 6 | 5 | 4 | 3 | 2 | 1 | 0 |
|---|---|---|---|---|---|---|---|---|
| 0 | Operation Code (53h) ||||||||
| 1 | Reserved ||||||| DL |
| 2 | Reserved ||||||||
| 3 | Reserved ||||||||
| 4 | Reserved ||||||||
| 5 | (MSB) |||||||  |
| 6 | Reservation ||||||||
| 7 | Size ||||||||
| 8 |  |||||||(LSB) |
| 9 | Control Byte ||||||||

FIG. 6

Write Parameters Page

| Byte \ Bit | 7 | 6 | 5 | 4 | 3 | 2 | 1 | 0 |
|---|---|---|---|---|---|---|---|---|
| 0 | PS | DL | Page Code (05h) ||||||
| 1 | Page Length (32h) ||||||||
| 2 | Reserved | BUFE | LS_V | Test Write | Write Type ||||
| 3 | Multi-session || FP | Copy | Track Mode ||||
| 4 | Reserved |||| Data Block Type ||||
| 5 | Link Size ||||||||
| 6 | Reserved ||||||||
| 7 | Reserved |||| Initiator Application Code ||||
| 8 | Session Format ||||||||
| 9 | Reserved ||||||||
| 10 | (MSB) | | | | | | | |
| 11 | Packet Size ||||||||
| 12 | | | | | | | | |
| 13 | | | | | | | | (LSB) |
| 14 | (MSB) | Audio Pause Length |||||||
| 15 | | | | | | | | (LSB) |
| 16 | (MSB) | | | | | | | |
| 17 | ... | | | | | | | |
| ... | Media Catalog Number ||||||||
| 30 | ... | | | | | | | |
| 31 | | | | | | | | (LSB) |
| 32 | (MSB) | | | | | | | |
| 33 | ... | | | | | | | |
| ... | International Standard Recording Code ||||||||
| 46 | ... | | | | | | | |
| 47 | | | | | | | | (LSB) |
| 48 | Sub-header Byte 0 ||||||||
| 49 | Sub-header Byte 1 ||||||||
| 50 | Sub-header Byte 2 ||||||||
| 51 | Sub-header Byte 3 ||||||||
| 52-55 | Vendor Specific ||||||||

FIG. 7

SEND DVD STRUCTURE Command Descriptor Block

| Bit<br>Byte | 7 | 6 | 5 | 4 | 3 | 2 | 1 | 0 |
|---|---|---|---|---|---|---|---|---|
| 0 | colspan="8" | Operation Code (BFh) |||||||
| 1 | Reserved |||| Reserved ||||
| 2 | Reserved ||||||||
| 3 | Reserved ||||||||
| 4 | Reserved ||||||||
| 5 | Reserved ||||||||
| 6 | Reserved ||||||||
| 7 | Format Code ||||||||
| 8 | (MSB) | Structure Data Length |||||||
| 9 | | | | | | | | (LSB) |
| 10 | Reserved ||||||||
| 11 | Control ||||||||
| 12 | Addressing Mode ||||||||
| 13 | Reserved ||||||||
| 14 | (MSB) | | | | | | | |
| 15 | Physical Address of the last user sector on L0 ||||||||
| 16 | | | | | | | | (LSB) |

FIG. 8

Format Field Definition

| Format Code | Data | Description |
|---|---|---|
| 00h - 03h | Reserved | |
| 04h | User Specific Data | Send User Specific Data to the RMD cache |
| 05h | Copyright Management | Send data to CPR_MAI in data area cache. (CPM, CGMS, ADP_TY) |
| 06h - 0Eh | Reserved | |
| 0Fh | Timestamp | Send Timestamp data to the RMD cache |
| 10h - 1Fh | Reserved | |
| 20h | User Specific Data | |
| 21h - 2Fh | Reserved | |
| 30h | Disc Control Block | Dual Layer Control Information Send a Disc Control Block |
| 31h - BFh | Reserved | |
| C0h | Write Protection | Send PWP status |
| C1h - FFh | Reserved | |

FIG. 9

READ DVD STRUCTURE Command

| Byte \ Bit | 7 | 6 | 5 | 4 | 3 | 2 | 1 | 0 |
|---|---|---|---|---|---|---|---|---|
| 0 | \multicolumn{8}{c}{Operation Code (ADh)} ||||||||
| 1 | \multicolumn{4}{c}{Reserved} | \multicolumn{4}{c}{Reserved} ||||||||
| 2 | (MSB) | | | | | | | |
| 3 | \multicolumn{8}{c}{Address} ||||||||
| 4 | | | | | | | | |
| 5 | | | | | | | | (LSB) |
| 6 | \multicolumn{8}{c}{Layer Number} ||||||||
| 7 | \multicolumn{8}{c}{Format} ||||||||
| 8 | (MSB) | \multicolumn{7}{c}{Allocation Length} |||||||
| 9 | | | | | | | | (LSB) |
| 10 | \multicolumn{4}{c}{AGID} | \multicolumn{4}{c}{Reserved} ||||||||
| 11 | \multicolumn{8}{c}{Control} ||||||||

FIG. 10

READ DVD STRUCTURE Data Format (Format field = 20h)

| Byte \ Bit | 7 | 6 | 5 | 4 | 3 | 2 | 1 | 0 |
|---|---|---|---|---|---|---|---|---|
| 0 | (MSB) | \multicolumn{7}{c}{DVD STRUCTURE Data Length} |||||||
| 1 | | | | | | | | (LSB) |
| 2 | \multicolumn{8}{c}{Reserved} ||||||||
| 3 | \multicolumn{8}{c}{Reserved} ||||||||
| | \multicolumn{8}{c}{DVD Lead-in Structure} ||||||||
| 0 | \multicolumn{8}{c}{Addressing mode} ||||||||
| 1 | \multicolumn{8}{c}{Reserved} ||||||||
| 2 | (MSB) | | | | | | | |
| 3 | \multicolumn{8}{c}{Physical Address of the last user sector on L0} ||||||||
| 4 | | | | | | | | (LSB) |

FIG. 11

MULTIPLE LAYER OPTICAL DISC, AND DEVICE FOR WRITING SUCH DISC

This application claims the benefit or priority of and describes relationships between the following applications: wherein this application is a continuation of U.S. patent application Ser. No. 10/575,002, filed Apr. 6, 2006, which is the National Stage of International Application No. PCT/IB2004/051866, filed Sep. 27, 2004, which claims the priority of foreign application EP 03103700.5 filed Oct. 6, 2003, all of which are incorporated herein in whole by reference.

The present invention relates in general to a multiple layer optical storage disc, and to a method and device for writing information into such disc.

As is commonly known, an optical storage disc comprises at least one track, either in the form of a continuous spiral or in the form of multiple concentric circles, of storage space where information may be stored in the form of a data pattern. Optical discs are very successful, and several different types have been developed. One such type is DVD (Digital Versatile Disc), and the present invention relates particularly to DVD discs, more particularly to DVD-Video, for which reason the present invention will be explained in the following for DVD-Video discs. However, the gist of the present invention is also applicable to other types of recordable discs; therefore, the following description is not to be understood as limiting the scope of the present invention to DVD discs only.

Optical discs may be read-only type, where information is recorded during manufacturing, which information can only be read by a user. The optical storage disc may also be a writeable type, where information may be stored by a user. Such discs may be a write-once type, indicated as writable (R), but there are also storage discs where information can be written many times, indicated as rewritable (RW). In the case of DVD, a distinction is made between two formats, i.e. DVD-RW and DVD+RW.

For writing information in the storage space of the optical storage disc, the storage track is scanned by an optical write beam, typically a laser beam, of which the intensity is modulated to cause material changes which can later be read out by scanning the storage track by an optical read beam. Since the technology of optical discs in general, and the way in which information can be stored in an optical disc, is commonly known, it is not necessary here to describe this technology in more detail.

As is commonly known, memory space of an optical disc is divided into blocks, each block having an identification or address, such that a writing apparatus can access a certain block to write data at a predefined location. In the case of RW-type discs, the storage space is physically present in the form of a groove (+RW) or pre-pits (−RW), the blocks are predefined, and the addresses are already allocated and coded in physical hardware features of the storage space. These addresses will be indicated as physical addresses. The combination of all physical addresses will also be indicated as physical storage space.

Typically, an optical storage system comprises an optical disc as a record medium, and further comprises a disc drive apparatus and a host apparatus. The disc drive apparatus is a device, comprising optical means for actually writing data, capable of accessing storage blocks at the level of physical addresses. Thus, in principle, the entire physical storage space is accessible to the disc drive apparatus. The host apparatus, which may be a PC running a suitable program, or an application of a consumer apparatus such as a video recorder, is a device which communicates with the disc drive, and sends commands to the disc drive instructing the disc drive to write certain data to a certain storage location. In contrast to the disc drive apparatus, the host apparatus only has access to a part of the physical storage space, this part being indicated as logical storage space, and the storage blocks in the logical storage space also have logical storage addresses. Although the logical storage space does not need to be a physically contiguous storage space, the storage blocks in the logical storage space have consecutive logical addresses, which are usually not identical to the physical addresses.

The host apparatus only has access to storage blocks at the level of logical addresses. Actually, it is perhaps not entirely correct to say that the host apparatus can access storage blocks; after all, the host apparatus can not access storage blocks directly, but only through the intermediary of the disc drive apparatus. The host apparatus requests the disc drive apparatus to access (write or read) a certain logical address. The disc drive apparatus, which has information regarding the relation between logical addresses and physical addresses, makes a translation to the required physical address, and accesses the corresponding block at the level of the physical address.

Conventionally, an optical disc has only one storage layer containing a storage track. More recently, optical discs have been developed having two or even more storage layers, each storage layer containing a storage track in the shape of a spiral or multiple concentric circles. In such case, the logical storage space extends over multiple storage layers, hence the range of logical addresses extends contiguously over multiple storage layers. The transition from the last block of one storage layer to the first block of the next storage layer is such that the logical address is incremented only by 1.

A typical problem occurs in the case of a DVD-Video Disc. According to the DVD Video Standard, it is (as a rule) not possible to continue writing right through to the last possible block of the first layer, and then to make a transition to the first block of the next layer. During writing, DVD Video data is organized in cells, and a transition from one layer to the next is only allowed at a cell boundary. This is related to the fact that, on reading video data from disc, it is desirable to have seamless continuation of video image display. Since it is usually not known in advance where these cell boundaries will be located, it is not known in advance where the transition from one layer to the next will be made. Consequently, it is not known in advance what the highest logical address of one storage layer is; likewise, it is not known in advance what the relation is between physical addresses and logical addresses in the next layer.

As a consequence, during writing, it is difficult to determine the storage capacity of the remaining disc.

Further, before being able to write in the second layer, a preparation process indicated as Optimal Power Calibration (OPC) is to be performed, which is performed in a dedicated area indicated as OPC area. It is most efficient if this OPC area is located as close as possible to the area where the transition from first layer to second layer is made. Further, it is most efficient if this OPC procedure can be performed in advance. If it is not known in advance where such transition area is located, the OPC area can only be created at the moment when the transition is to take place, and also the OPC procedure can take place only then, which is disadvantageous because such procedure takes time.

In the case of a dual layer disc, the structure of the first layer is described in the DVD-standard: numbering of the logical addresses starts at physical address 30000, and increases from smaller radius to larger radius. For the next layer, there are two possibilities. In one possibility, indicated as Parallel Track Path (PTP), the logical addresses are numbered from the inner track radius to the outer track radius, too. In another possibility, indicated as Opposite Track Path (OTP), the logical addresses are numbered from the outer track radius to the inner track radius. In a PTP case, after a jump from the first track to the next, writing continues at the innermost track of the available storage space; in such case, the storage capacity of the next track is independent from the location of the last block of the first track. In an OTP case, however, after a jump from the first track to the next, writing continues at the location of the jump; in such case, the size of the available logical space in the next track is clearly dependent on the location of the last block of the first track.

In practice, a disc drive does not continue writing till the very last physical address of a storage layer before jumping to the next storage layer. Instead, the disc drive has a parameter which will be indicated hereinafter as LAmax, and which indicates a maximum value for the logical addresses of a layer. When, on writing, the disc drive reaches the block with logical address LAmax, a jump is made to the next storage layer. Usually, this is not the most suitable location with a view to video cell boundaries, but the disc drive itself has no means for determining or calculating such boundaries. In contrast, the host device is capable of determining video cell boundaries, but the host device is only capable of determining logical addresses; more particularly, the host device is not capable of instructing the disc drive to use a specific physical address, and is not capable of instructing the disc drive to go to a next storage layer.

An important objective of the present invention is to overcome the above difficulties.

More specifically, an objective of the present invention is to assure that the last logical address of a storage layer corresponds to a video cell boundary, in order to assure seamless image reproduction on reading.

In the above, objectives of the present invention have been explained in the context of video cell boundaries in the case of writing video data. However, it may be desirable for other reasons to be able to adjust the size of the logical space of a storage layer, i.e. the number of logical addresses in a storage layer. Therefore, a general objective of the present invention is to be able to vary the size of the logical space of a storage layer.

According to an important aspect of the present invention, a disc drive is capable of changing the value LAmax. A host is capable determining a cell boundary, and to calculate a suitable value for LAmax, and to send a command to the disc drive, effectively instructing the disc drive to take the calculated value for LAmax. In response, the disc drive stores this value in a memory location.

These and other aspects, features and advantages of the present invention will be further explained by the following description with reference to the drawings, in which same reference numerals indicate same or similar parts, and in which:

FIG. 6 is a table illustrating a RESERVE TRACK command suitable for use in a write method in accordance with the present invention;

FIG. 7 is a table illustrating a WRITE PARAMETERS MODE PAGE command suitable for use in a write method in accordance with the present invention;

FIG. 8 is a table illustrating a SEND DVD STRUCTURE command suitable for use in a write method in accordance with the present invention;

FIG. 9 is a table illustrating a format field of a SEND DVD STRUCTURE command;

FIG. 10 is a table illustrating a READ DVD STRUCTURE command;

FIG. 11 is a table illustrating READ DVD STRUCTURE data.

Figure 1:
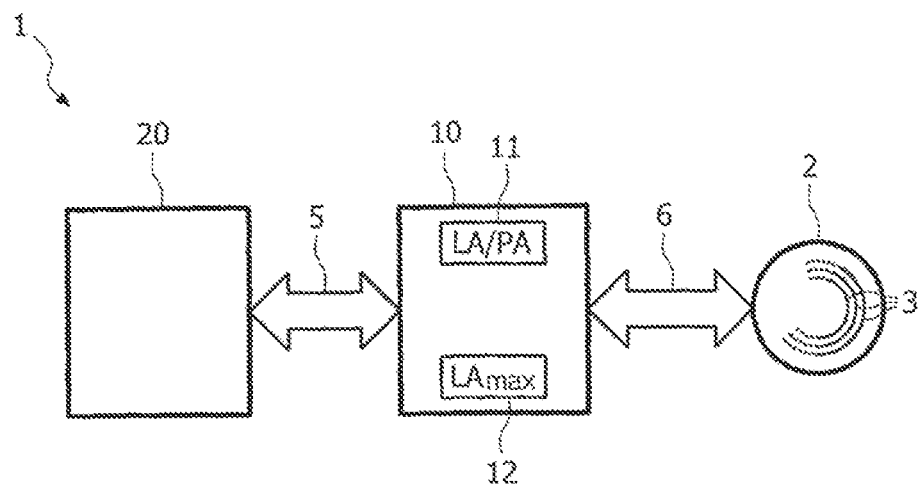
FIG. 1 is a block diagram schematically illustrating a data storage system.

FIG. 1 is a block diagram schematically illustrating a data storage system 1, comprising a data storage medium 2, a medium access device 10, and a host device 20. In a typical practical implementation, the host device 20 may be a suitably programmed personal computer (PC); it is also possible that the data storage system 1 is implemented as a dedicated user apparatus such as a video recorder, in which case the host device 20 is the application part of such apparatus. In a specific embodiment, the data storage medium 2 is implemented as an optical disc, specifically a DVD, more specifically a DVD+R, in which case the medium access device 10 is implemented as a disc drive. In the following, the invention will be described specifically for an optical disc implementation, but it is noted that the present invention is not limited to optical discs.

The optical disc 2 has a storage space 3, which has the form of two or more continuous spiral-shaped tracks or track in the form of multiple concentric circles, where information can be stored in the form of a data pattern. Since this technology is commonly known to persons skilled in the art, this technology will not be explained in further detail.

Figure 2A:
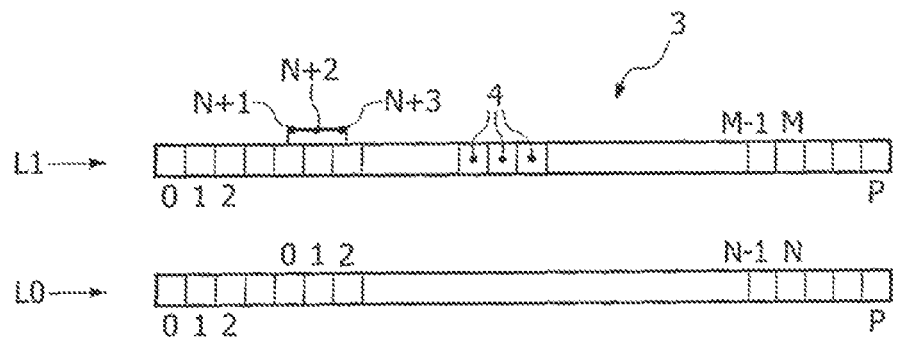
FIG. 2A is a diagram schematically depicting a double-track storage space of a storage medium in a PTP case.

The several tracks of the storage space 3 are located in different storage layers of the optical disc 2, which storage layers will be indicated L0, L1, etc. FIG. 2A is a diagram schematically depicting the storage space 3 as a collection of long ribbons, each ribbon corresponding to a storage layer L0, L1, for a case where the optical disc 2 has two storage layers. The storage space 3 is divided into a large number of blocks 4. Each block has a physical address, which will hereinafter be indicated as PA. In FIG. 2A, the physical addresses PA are indicated underneath the blocks 4: in each storage layer L0, L1, the numbering of the physical addresses starts at zero (left-most block in FIG. 2A). Each following block has an address which is one higher then its previous neighbour. The last block has the highest address P0, P1. In case the two storage layers L0 and L1 have equal size, P0=P1.

Most blocks also have a logical address, which will hereinafter be indicated as LA; in FIG. 2A, logical addresses are indicated above the blocks 4. It can be seen that numbering starts at LA=0 for a certain block in L0, which typically is the block with PA=30000.

The highest logical address in L0 is indicated as N; it can be seen that this is not necessarily the last block of L0.

The lowest logical address in the next storage layer L1 is LA=N+1, for a certain block in L1, which is not necessarily the first block; typically, this is the block with PA=30000 in L1, i.e. the same physical address as the first logical address LA=0 in the first storage layer L0, but this is not essential.

The highest logical address is indicated as N; it can be seen that this does not necessarily corresponds to the last block of L1.

Figure 2B:
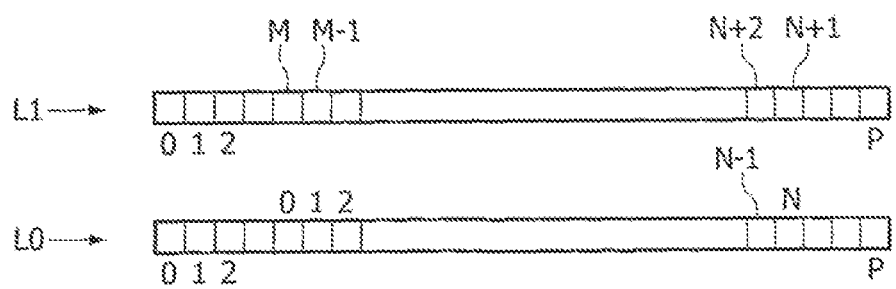
FIG. 2B is a diagram schematically depicting a double-track storage space of a storage medium in an OTP case.

In the first logical layer L0, when comparing two blocks, the one with the highest logical address also has the highest physical address. In FIG. 2A, the same applies to the second storage layer L1; such configuration is indicated as Parallel Track Path (PTP). FIG. 2B is a diagram comparable to FIG. 2A, for a case of an Opposite Track Path (OTP) configuration, in which case increasing logical addresses corresponds to decreasing physical addresses. In that case, the radial location of block LA=N in L0 corresponds to the radial location of block LA=N+1 in L1, as indicated.

Figure 2C:
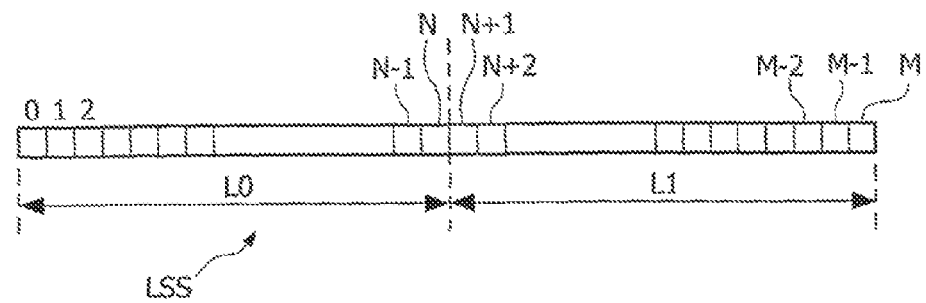
FIG. 2C is a diagram schematically depicting a logical storage space.

The blocks having a logical address together define the logical storage space (LSS). FIG. 2C is a diagram schematically depicting the LSS as one long continuous ribbon. In the LSS, the addresses range from zero to M. When the host device 20 wants to access a certain piece of information, it sends a request to the disc drive 10, indicating the corresponding logical address. The disc drive 10 comprises a memory 11, which contains information regarding the relationship between logical addresses LA and physical addresses PA, for instance in the form of a look-up table. Based on this information, the disc drive 10 determines which storage layer and which physical address correspond to the required logical address.

Figure 3:
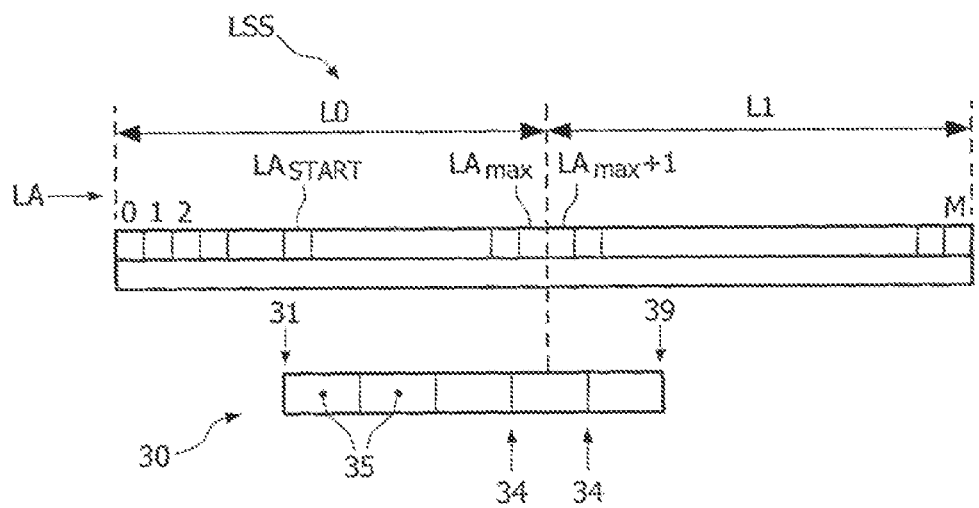
FIG. 3 is a diagram schematically depicting a logical storage space as well as a video sequence.

FIG. 3 is a diagram comparable to FIG. 2C, showing the LSS, and also showing schematically a video sequence 30, for instance corresponding to a movie, also illustrated as a ribbon, which extends from a location in L0 to a location in L1. The video sequence 30 has a start 31 and an end 39. The data of the video sequence 30 define video cells 35; cell boundaries between the video cells 35 are indicated at 34. With respect to "video cells", reference is made to part III of the DVD video specification.

In FIG. 1, a host/drive communication link between host device 20 and disc drive 10 is indicated at 5. Likewise, a drive/disc communication link between disc drive 10 and disc 2 is indicated at 6. The drive/disc communication link 6 represents the physical (optical) read/write operation as well as the physical addressing of blocks 4 of the storage space 3. The host/drive communication link 5 represents a data transfer path as well as a command transfer path.

Assume that a data storage system 1, not implemented in accordance to the present invention, is to store the video sequence 30. The host device 20 transfers the video sequence 30 to the disc drive 10 over host/drive communication link 5, and the disc drive 10 writes the video sequence 30 to disc 2 over drive/disc communication link 6, wherein the start 31 of the video sequence 30 is written at a block in L0 having a certain logical address $LA_{START}$ which may be determined by the host device 20, or which may be the first available block after a previous recording.

The disc drive 10 has an address limit memory 12, containing a default value for a parameter LAmax indicating the maximum value of the logical addresses in the first storage layer L0. The disc drive 10 is designed to compare the logical addresses of the blocks accessed with the value of LAmax in its address limit memory 12. As writing continues, the logical addresses increase. If the block is reached for which LA=LAmax, the disc drive 10 makes a transition to the first available block in the next storage layer L1, which now obtains logical address LA=LAmax+1. It can be seen in FIG. 3 that this transition corresponds to a location somewhere within a video cell 35.

Figure 4:
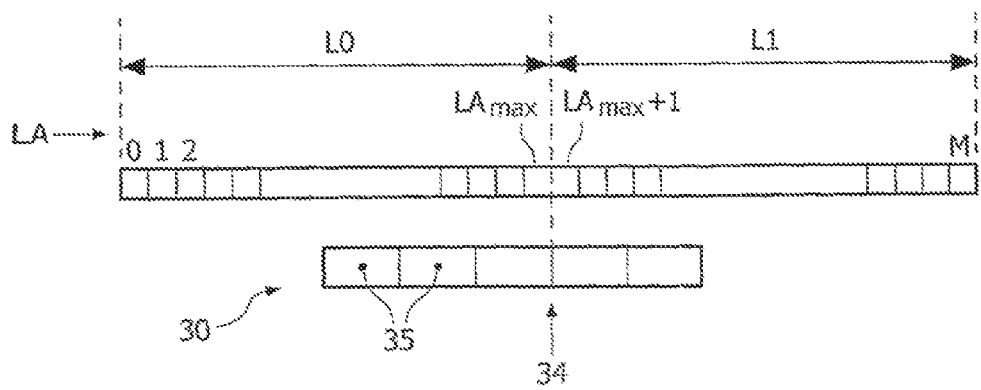
FIG. 4 is a diagram schematically depicting a logical storage space as well as a video sequence.
Figure 5:
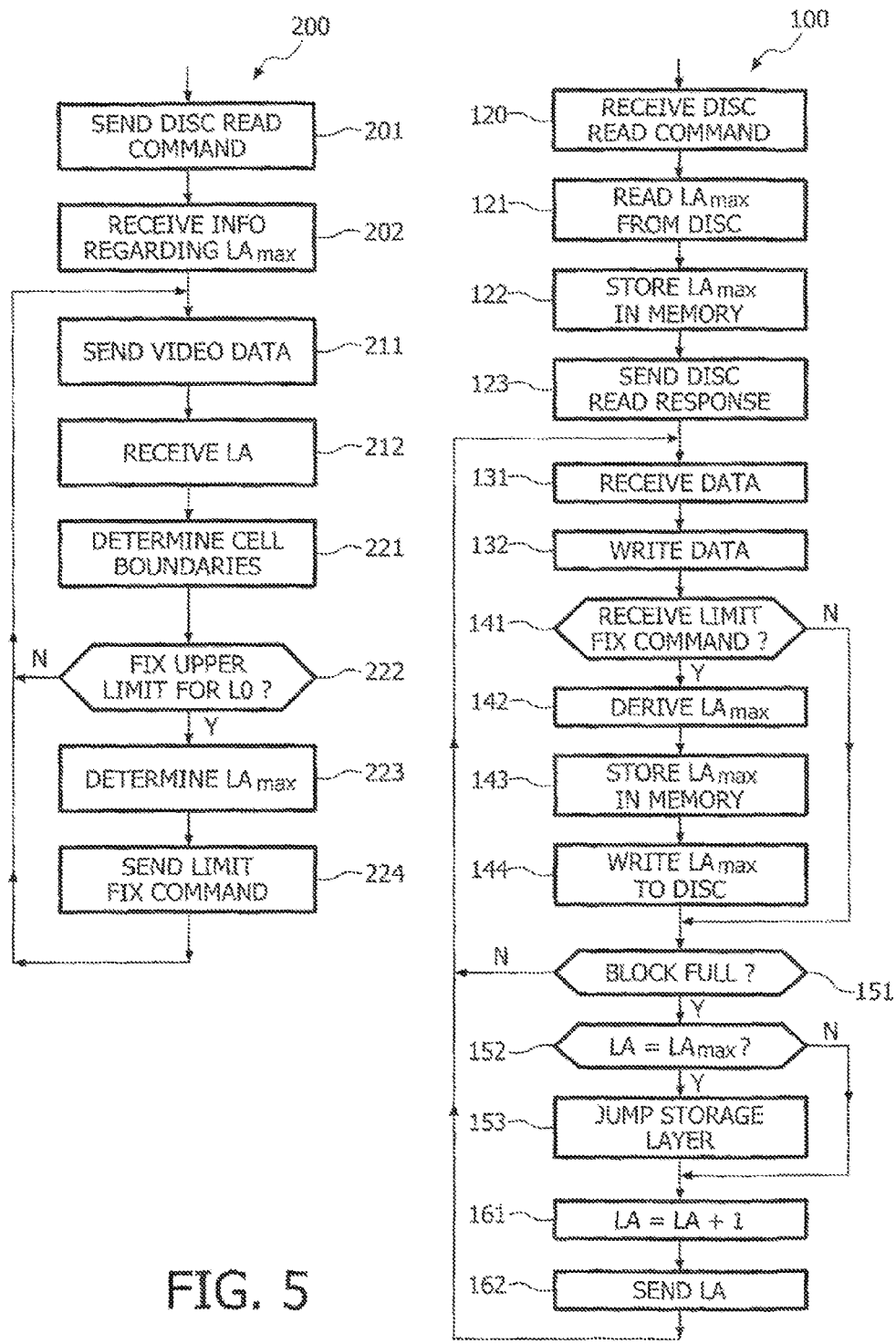
FIG. 5 is a flow diagram schematically illustrating steps of a write method in accordance with the present invention.

FIG. 4 is a diagram comparable to FIG. 3, now for the case of a data storage system 1 implemented in accordance with the present invention. FIG. 5 is a flow diagram, schematically illustrating steps of the operation 200 of the host device 20 and the operation 100 of the disc drive 10 when performing a write method in accordance with the present invention.

The host device 20 sends video data to the disc drive 10 [step 211]. The disc drive 10 receives these data [step 131] and writes the data received to disc 2 [step 132].

After having completed a block [step 151], the disc drive 10 compares the logical address LA of the current block with the value of LAmax in its address limit memory 12 [step 152]. If the upper limit LAmax has been reached, the disc drive makes a transition [step 153] to the first available block in the next storage layer L1, otherwise this transition step is skipped. In respect of the next available block, the logical address LA is increased by one [step 161], and this address is communicated to the host device [step 162]. Then, operation of the disc drive returns to step 131.

The host device 20 receives the logical address LA as communicated by the disc drive 10 [step 212]. This information allows the host device 20 to keep track of the recording location of the video data, if desired.

The host device 20 is capable to evaluate the video data to be written, and is thus capable to determine where cell boundaries are to be expected [step 221].

According to an important aspect of the present invention, the host device 20 determines whether it should fix a value for the last logical address in L0 [step 222]. For instance, it may be that the host device 20 finds that only a small number of cells fit into the remaining part of L0. If the host device 20 decides to fix a value for the last logical address in L0, it determines a value LAmax [step 223], and it sends [step 224] a special command to the disc drive 10, which will hereinafter be indicated as Limit Fix Command LFC. Then, operation of the host device returns to step 211.

In the step of determining a value LAmax, the host device 20 takes into consideration the cell boundaries as determined in step 221. Particularly, the host device 20 determines the value LAmax such that the block having address LA=LAmax receives the last block of a video cell.

The disc drive 10 checks whether it receives the Limit Fix Command LFC [step 141]. If it does, it derives LAmax from the Limit Fix Command LFC [step 142], and it stores this value into its address limit memory 12 [step 143].

Consequently, when later the block having address LA=LAmax is written, it receives the last block of a video cell, and the first available block in the next storage layer L1 receives the first block of a next video cell, so that the transition from the first storage layer L0 to the next storage layer L1 corresponds to a video cell boundary 34, as illustrated in FIG. 4.

The information contained in the Limit Fix Command LFC should be such as to enable the disc drive 10 to derive LAmax. It is possible that the Limit Fix Command LFC contains the value of LAmax itself, or another number directly related to LAmax, which is specifically suitable in cases where it is desirable to align storage blocks 4 with video cell boundaries 34. However, it is also possible that it is desirable to simply fix the maximally available size of the storage space 3, for instance to adapt this maximum to a video recording to be written. In such case, it might be suitable to send information defining a value for M, in which case the disc drive 10 may derive LAmax from the information received, either by division by 2 (suitable in the case of OTP) or by subtracting the full size of the second storage layer L1 (suitable in the case of PTP).

In a preferred embodiment, also illustrated in FIG. 5, the disc drive 10 is designed to also write LAmax to a predetermined location on disc [step 144], which location may be located in a part of the storage space 3 reserved for use by the disc drive. This offers the advantage that it is possible to fix LAmax for a certain disc, which value of LAmax is also respected by other disc drives. To this end, it is further preferred that the disc drive 10 is adapted, on receiving a new disc 2, to read the said predetermined location of the disc [step 121] and to store the read value into the address limit memory 12 [step 122], as also illustrated in FIG. 5. If the disc does not have a value for LAmax written in said predetermined location, the disc drive 10 maintains the default setting for LAmax.

The disc drive 10 may read the information of said predetermined location of the disc on its own initiative, or on receiving a Disc Read Command from the host 20, or both. In the embodiment illustrated in FIG. 5, the host 20 is adapted to first send a Disc Read Command to the disc drive [step 201]. The disc drive 10 receives the Disc Read Command [step 120], and, in response, it reads the said predetermined location of the disc [step 121], and sends to the host 20 a Disc Read Response containing information relating to LAmax [step 123]. The host 20 receives [step 202] this information, which may be a value identical to LAmax or a value from which LAmax can be derived. If the disc does not have a value for LAmax written in said predetermined location, the disc drive 10 may send the default address, but it is also possible that the disc drive sends a code, for instance address=zero, indicating that LAmax has not been fixed yet.

The information in the Disc Read Response received from the disc drive 10 is used by the host 20, in step 222, when the host 20 determines whether or not it should fix a value for the last logical address in L0. If the information in the Disc Read Response indicates that the host 20 is free to amend LAmax, operation of steps 221-224 continues as described above. However, if the information in the Disc Read Response indicates that it is not possible to amend LAmax, for instance because LAmax has already been fixed previously, the host 20 will always exit step 222 at the NO exit, effectively skipping steps 223-224; or, the host 20 may even skip step 222.

There are several practical possibilities envisaged for implementing the Limit Fix Command LFC. First, it is of course possible to define an entirely new command. However, it is easier to adapt existing commands of an existing command set. An example of a widely used command set is indicated as MMC3, also indicated as "Mount Fuji" (see, for instance, ww.t10.org: "Multimedia Command Set Version 3 Revision 10G"). In the following, several examples of suitable existing commands will be described.

EXAMPLE 1

Reserve Track (RT)

As illustrated by the table in FIG. 6, the RT command comprises 10 bytes of 8 bits each. Bytes 1 to 4 are reserved for later definition, i.e. they do not have a defined meaning yet. So, it is possible to use any one of the bits of these bytes as "Define LAmax" bit DL, indicating that the RT command is to be taken as a Limit Fix Command LFC. For instance, as indicated, the value of bit 0 of byte 1 may indicate RT=LFC. Bytes 5 to 8 contain "reservation size", wherein byte 8 is the least significant byte while byte 5 is the most significant byte. In the case that the RT command is used as Limit Fix Command LFC, these bytes 5 to 8 may contain a value indicating LAmax.

EXAMPLE 2

Write Parameters Page (WPP)

As illustrated by the table in FIG. 7, the WPP command comprises 56 bytes of 8 bits each. Bytes 32 to 47 contain "International Standard recording Code", which does not hold for DVD, therefore these bytes could contain a value indicating LAmax. Several bytes are reserved for later definition, i.e. they do not have a defined meaning yet, for instance bit 6 of byte 0, bits 4-7 of byte 4, byte 6, bits 6-7 of byte 7, byte 9. So, it is possible to use any one of these bits as "Define LAmax" bit DL, indicating that the WPP command is to be taken as a Limit Fix Command LFC. For instance, as indicated, the value of bit 6 of byte 0 may indicate WPP=LFC.

EXAMPLE 3

Send DVD Structure (SDS)

As illustrated by the table in FIG. 8, the SDS command comprises 17 bytes of 8 bits each. Bytes 1 to 6 are reserved for later definition, i.e. they do not have a defined meaning yet. So, it is possible to use any one of these bits as "Define LAmax" bit DL, indicating that the SDS command is to be taken as a Limit Fix Command LFC, in which case bytes 8-9, which contain "structure data length", may contain a value indicating LAmax.

It is also possible to use byte 7, which contains a "format code", its value containing a definition for the meaning of the following bytes. The table in FIG. 9 illustrates the current definition of the format field. Value 20h for byte 7 may for instance be used to indicate that the SDS command contains 17 bytes, and that bytes 14-16 contain a value indicating LAmax.

There are also several practical possibilities envisaged for implementing the Read Disc Command. A suitable existing command is the read dvd structure command.

EXAMPLE 4

Read DVD Structure (RDS)

As illustrated by the table in FIG. 10, the RDS command comprises 12 bytes of 8 bits each. Byte 7 contains a format code, which indicates the meaning of the RDS command; Bytes 2-5 contain address information as a parameter to this RDS command, which parameter is not necessary in the case of a Read Disc Command since the disc drive 10 will know at which address to look. For instance, value 20h for the format code might be used to indicate that the RDS command is to be taken as a Read Disc Command.

FIG. 11 is a table illustrating a possible Disc Read Response which might be sent by the disc drive 10 to the host 20. The Read DVD Structure Data format comprises a field having the name "DVD Lead-in Structure", containing 5 bytes of 8 bits each. For instance, byte 2-4 of this field may be used to indicate the logical address of the last user sector in the first layer L0. This may be done by directly giving the value of LAmax, but it is also possible, for instance, to give the physical address of the last user sector in the first layer L0, from which LAmax can be derived.

It should be clear to a person skilled in the art that the present invention is not limited to the exemplary embodiments discussed above, but that several variations and modifications are possible within the protective scope of the invention as defined in the appending claims.

For instance, the above-mentioned examples do not involve an exhaustive listing; it is possible to use other existing commands for instructing a disc drive to fix an upper value for the logical addresses in a storage layer, but, at least currently, the examples mentioned are preferred.

Further, instead of sending the limit fix command as embedded in video data, it is also possible that the host device 20 sends the limit fix command independent from video data.

In the above, the invention has been explained for the case of a disc having two storage layers. However, the gist of the present invention is also applicable in the case of multiple layers. In a limit fix command, the host may include the identity of the layer for which the limit is to be fixed, but it is also possible that the limit fix command is always interpreted as applying to the layer currently be written.

It may be possible that the host sends the limit fix command when it is transferring the last video cell that will fit in the current layer. However, it is also possible that the host is capable of determining where the cell boundaries are a long time in advance, so that the limit fix command may be sent a long time before transferral of the last video cell.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. A host device for controlling an optical drive capable of writing information in a logical storage space (LSS) of an optical disc which has a physical storage space comprising two or more layers (LO; LI) of physical storage locations,
   each storage location having a physical address (PA),
   the logical storage space (LSS) comprising storage locations within a first storage layer (LO) of said layers and within a subsequent storage layer (LI) of said layers,
   the storage locations in said logical storage space (LSS) having contiguously numbered logical addresses (LA);
   the optical drive capable of receiving data from the host device, the data containing information to be written onto the optical disc and/or data containing instructions for said optical drive,
   the optical drive having an address limit memory containing at least a value for a parameter LAmax indicating the maximum value of the logical addresses (LA) of the storage locations in the first storage layer (LO);
   the optical drive is configured to receive from the host device a limit fix command instructing said optical drive to store a value for the parameter LAmax as determined by the host device in said address limit memory,
   the optical drive being configured to change the value for the parameter LAmax in said address limit memory to the value received from the host device,
   the host device being configured to send data to said optical drive, the data containing information to be written on said optical disc and/or containing instructions for said optical drive;
   the host device being configured to send a limit fix command to said optical drive for instructing said optical drive to store a host determined value in its address limit memory, and
   the host device being further configured to send a Disc Read Command to said optical drive and to receive a Disc Read Response from said optical drive, indicating whether or not said parameter LAmax is changeable, the host device being further configured to avoid sending the limit fix command in response to receiving a Disc Read Response from said optical drive indicating that said parameter LAmax cannot be changed.

2. A data storage system comprising:
   a writeable optical disc having a physical storage space comprising two or more layers (LO; LI) of physical storage locations, each storage location having a physical address (PA), the physical storage space comprising a logical storage space (LSS) which contains storage locations within a first one (LO) of said layers and within a subsequent one (LI) of said layers, the storage locations in said logical storage space (LSS) having contiguously numbered logical addresses (LA);
   an optical drive capable of writing information in a logical storage space (LSS) of a optical disc which has a physical storage space comprising two or more layers (LO; LI) of physical storage locations,
   each storage location having a physical address (PA),
   the logical storage space (LSS) comprising storage locations within a first one (LO) of said layers and within a subsequent one (LI) of said layers,
   the storage locations in said logical storage space (LSS) having contiguously numbered logical addresses (LA);
   the optical drive capable of receiving data from a host device, the data containing information to be written onto the optical disc and/or data containing instructions for said optical drive
   the optical drive having an address limit memory containing at least a value for a parameter LAmax indicating the maximum value of the logical addresses (LA) of the storage locations in the first storage layer (LO);
   the optical drive is configured to receive from the host device a limit fix command instructing said optical drive to store a value for the parameter LAmax as determined by the host device in said address limit memory,
   the optical drive being configured to change the value for the parameter LAmax in said address limit memory to the value received from the host device; and
   the host device for controlling the disc drive,
   the host device being configured to send data to said optical drive, the data containing information to be written on said optical disc and/or containing instructions for said optical drive;
   the host device being configured to send the limit fix command to said optical drive for instructing said optical drive to store a host determined value in its address limit memory, and
   wherein said limit fix command (LFC) is sent as a modified RESERVE TRACK (RT) command.

3. A data storage system comprising:
   a writeable optical disc having a physical storage space comprising two or more layers (LO; LI) of physical storage locations, each storage location having a physical address (PA), the physical storage space comprising a logical storage space (LSS) which contains storage locations within a first one (LO) of said layers and within a subsequent one (LI) of said layers, the storage locations in said logical storage space (LSS) having contiguously numbered logical addresses (LA);
   an optical drive capable of writing information in a logical storage space (LSS) of a optical disc which has a physical storage space comprising two or more layers (LO; LI) of physical storage locations, each storage location having a physical address (PA), the logical storage space (LSS) comprising storage locations within a first one (LO) of said layers and within a subsequent one (LI) of said layers, the storage locations in said logical storage space (LSS) having contiguously numbered logical addresses (LA);

the optical drive capable of receiving data from a host device, the data containing information to be written onto the optical disc and/or data containing instructions for said optical drive the optical drive having an address limit memory containing at least a value for a parameter LAmax indicating the maximum value of the logical addresses (LA) of the storage locations in the first storage layer (LO);

the optical drive is configured to receive from the host device a limit fix command instructing said optical drive to store a value for the parameter LAmax as determined by the host device in said address limit memory, the optical drive being configured to change the value for the parameter LAmax in said address limit memory to the value received from the host device; and the host device for controlling the disc drive, the host device being configured to send data to said optical drive, the data containing information to be written on said optical disc and/or containing instructions for said optical drive;

the host device being configured to send the limit fix command to said optical drive for instructing said optical drive to store a host determined value in its address limit memory, and wherein said limit fix command (LFC) is sent as a modified WRITE PARAMETERS PAGE (WPP) command.

\* \* \* \* \*